United States Patent [19]

Schäfer

[11] 4,253,414

[45] Mar. 3, 1981

[54] METHOD AND APPARATUS FOR CLUTCH CONTROL IN THE OPERATION OF A SHIP'S PROPULSION SYSTEM HAVING A DIESEL MOTOR

[76] Inventor: Wilhelm Schäfer, Käthe-Kollwitz-Weg 1, 5810 Witten-Bommern, Fed. Rep. of Germany

[21] Appl. No.: 844,565

[22] Filed: Oct. 25, 1977

[30] Foreign Application Priority Data

Nov. 15, 1976 [DE] Fed. Rep. of Germany ....... 2652385

[51] Int. Cl.³ .......................... B63H 1/14; B63H 5/06
[52] U.S. Cl. ................................. 440/84; 192/103 F; 192/0.07
[58] Field of Search ................... 115/34 R; 192/85 R, 192/103 F–104 F

[56] References Cited

U.S. PATENT DOCUMENTS

| | | | |
|---|---|---|---|
| 2,741,351 | 4/1956 | Fletcher | 115/34 R |
| 3,437,188 | 4/1969 | Long | 192/103 F |
| 3,752,280 | 8/1973 | Cheek | 192/103 F |
| 3,922,997 | 12/1975 | Jameson | 115/34 R |

*Primary Examiner*—Trygve M. Blix
*Assistant Examiner*—D. W. Keen
*Attorney, Agent, or Firm*—A. C. Nolte, Jr.; Edward B. Hunter; Jay H. Maioli

[57] ABSTRACT

The invention relates to a method and apparatus for the operation of a ship's propulsion installation with a Diesel motor, whereby a pressure-medium-activated friction clutch with adjustable pressure-medium feed is provided between the Diesel engine and the ship's drive.

4 Claims, 1 Drawing Figure

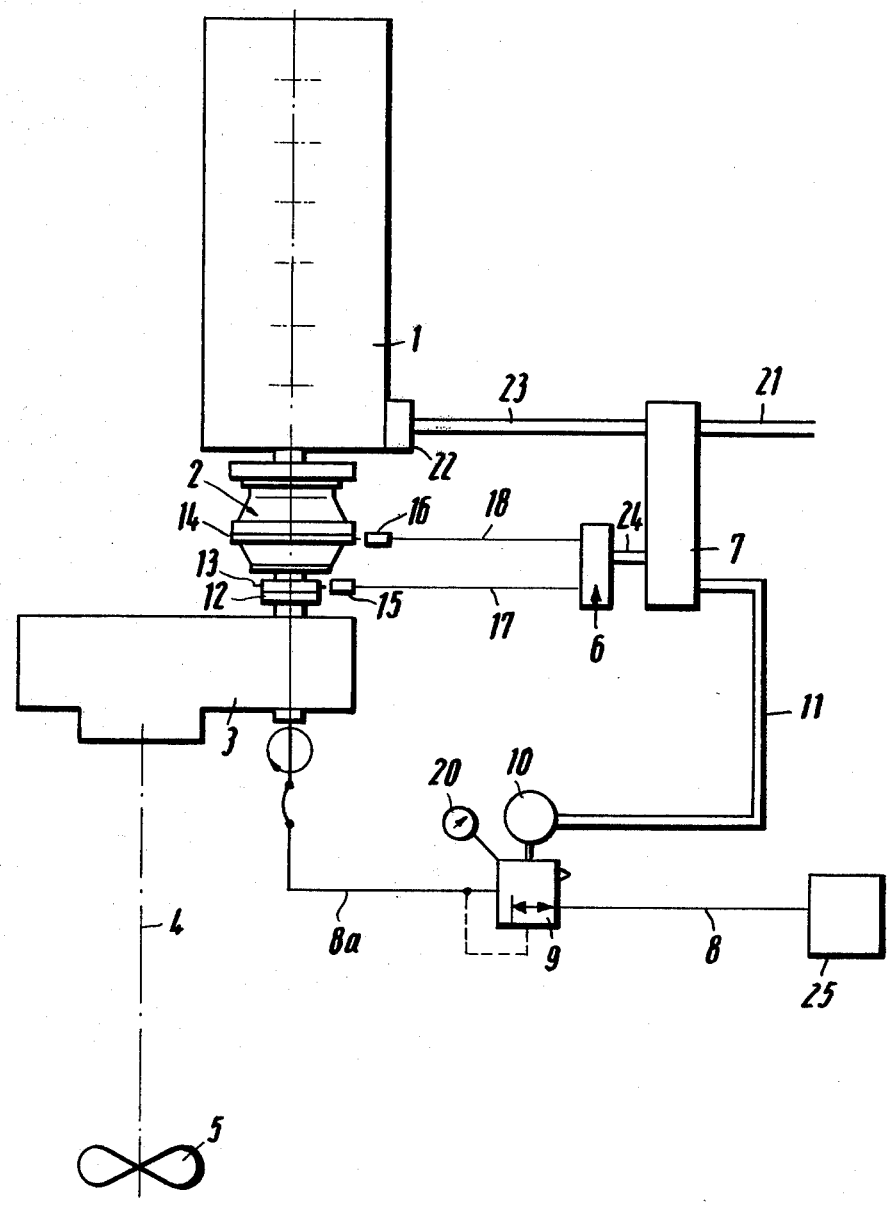

METHOD AND APPARATUS FOR CLUTCH CONTROL IN THE OPERATION OF A SHIP'S PROPULSION SYSTEM HAVING A DIESEL MOTOR

PRIOR ART

In the German Patent No. 22 44 919, which relates to a hydraulically operated multiple disk clutch for marine (ship's) reversing gears, various embodiments are described which deal with the clutching problems encountered when the ship's propulsion installation is started. In essence, it was proposed to accelerate the engaging of the friction clutch by increasing the pressure of the pressure-medium, or to effect a slow switching whereby the pressure of the pressure-medium is gradually brought to the operating pressure. In the case of such a slow switching, the friction clutch runs in the first phase (shift) with a gradually diminishing slippage. By these known measures, an attempt is made to compensate for the deviations from normal operation which occur when a ship's propulsion installation is started.

However, such deviations from normal operations do not only occur during the starting phase or during the application of a ship's reversing gear. It is quite possible that they also occur during the normal operation of a ship, for instance as a result of the failure of a cylinder of the Diesel engine which runs, as a rule, at a medium speed. Because of the resulting increased alternating torques or torsional moments, increased stresses occur in the ship's propulsion installation which may continue up to the drive train of the ship. If the propulsion installation contains a highly elastic clutch, the highly elastic parts, which are usually built on a rubber base, are particularly in danger, as experience has shown.

A reduction of the increased alternating torques and, thus, a reduction of the stresses to tolerable values can be achieved, among other ways, by installing a slip clutch into the drive-system. The disadvantage of the hydraulic slip clutches lies in the costs of providing the same and particularly when an additional hydraulic clutch must be inserted in a drive system with relatively low speed.

Even pneumatically operated, highly elastic clutches permit slippage. However, the same must be so proportioned that, on the one hand, the necessary damping (attenuation) for the reduction of the overstresses to a tolerable level is achieved and, on the other hand, a premature wear and tear of the clutch's friction linings does not occur as a result of over-heating. In the case of these highly elastic, pneumatic clutches, maintaining a pre-adjusted slippage over a longer period of time creates a problem in that the restoring forces which are originally present and which are needed for disengagement, undergo a change as a result of the gradual wear and tear of the linings and the resulting increase of the axial shifting path or control distance. Furthermore, there results a change in the elastic properties of the rubber elements during operation. A further factor lies in a change of the friction value under the various operating conditions. Also, it has to be considered in principle as a bad solution to operate a friction clutch with slippage in continuous operation for no other reason but to be able to dampen the increased alternating torques which occur at a time which cannot be determined beforehand.

OBJECTS OF THE INVENTION

It is the object of the invention to eliminate the above mentioned disadvantages and to establish a method in the operation of a ship's propulsion installation for compensating for deviations from normal operations, which occur at any time, and to do so without damage to the clutch.

According to the invention, it is therefore proposed that the pressure of a pressure-medium activated friction clutch is controlled in dependency upon the running-behavior of the Diesel engine, and this in a way that, as soon as increased alternating torques occur, the pressure of the pressure-medium, which is initially adjusted to a higher pressure holding value when the Diesel engine idles, decreases and is automatically adjusted to a value which brings about a slippage in the friction clutch which dampens the alternating torques, and this for as long as the increased alternating torques last.

Through the invention, the disadvantages connected with prior art solutions are avoided and a clutch control in the drive is established which does not require a costly, and in some cases additional, slip clutch and which is, nevertheless, able to react to sudden irregularities which may occur in the drive system.

When engine irregularities occur, clutch slippage is advantageously adjusted to a permitted predetermined amount, whereby through the adjustment this amount of slippage permitted is maintained throughout the duration of the engine irregularities. Conventional means are utilized for the detection of engine irregularities; for instance by means of measuring scanners on the Diesel engine or the detection of the difference in the speeds of rotation between the clutch-halves. Confer, for instance Austrian Patent No. 331,084 for means to detect the speed difference between the halves of a slip clutch.

A ship's propulsion installation, for which provisions have been made for a device for the monitoring of the running behavior of the Diesel engine and for a slippage-measuring device on a pressure-medium activated friction clutch which detects quantitatively a slippage of the clutch, distinguishes itself, according to the invention, in that the device for the monitoring of the running behavior and the slippage-measuring device are connected with a regulator which activates a valve which controls the feed of the pressure medium to the pressure activated clutch.

An advantageous combination is achieved when the friction clutch is an elastic double-tapered friction clutch which is pneumatically operated and known as such. Such a clutch is disclosed in U.S. Pat. No. 3,708,048 which issued Jan. 2, 1973 and which patent is incorporated herein by reference. In this case, the elastic elements of the double-tapered friction clutch undertake the damping of the normal alternating torques, while the increased alternating torqures are being damped through the measure according to the invention.

The accompanying drawing shows in schematic presentation an embodiment of the invention.

The ship's propulsion installation shown in the drawing consists of a Diesel engine 1 which drives a ship's drive gear 3 via a pressure-medium activated friction clutch 2 and a simple shaft coupling 12. The drive gear 3 drives the propeller shaft 4, indicated in the drawing by a dash-dotted line, which in turn drives the propeller 5.

The Diesel engine is equipped with a device 22 for the monitoring of the engine's running behavior, and is connected to a regulator 7 via a connecting line 23. The energy supply of the regulator 7 has been assigned reference number 21. Furthermore, a slippage-measuring-device 6 is also connected to the regulator 7 via an additional connecting line 24. The slippage-measuring-device 6 includes two measuring scanners 15 and 16 as well as their connections 17 and 18. The measuring scanners 15 and 16 receive impulses from their respective impulse sensor-transmitter 13 and 14. The impulse transmitter 14 comprises pins which are distributed on the periphery (circumference) of the primary or driving part of the pressure-medium-activated friction clutch 2, while the impulse transmitter 13 comprises pins arranged on the driven part which is rigidly connected with the secondary part of the friction clutch 2, here with the shaft coupling 12.

The regulator 7 is connected via control line 11 with the actuator 10 of a valve 9 which controls the supply of the pressure medium. This divides the pressure-medium-line into a circuit section 8, located in front of the valve 9, which circuit section is connected to a pressure-medium source 25, and into a section 8a in which the required or desired operating pressure for the friction clutch 2 prevails and whereby this pressure is shown on an indicator device 20.

During normal operation, the valve 9 furnishes an operating pressure which is so great that the friction clutch 2 runs without slippage. This normal operating pressure is in this instance the higher pressure holding value. As soon as the device 22 monitoring the engine running behavior reports an irregularity, for instance a cylinder failure, an order is issued to the actuator 10, via the regulator 7, to throttle the value 9. The throttling causes an appropriate decrease of the pressure in the circuit section 8a and a slippage in the friction clutch 2. This slippage is quantitatively detected by the slippage-measuring-device 6 and reported to the regulator 7. This regulator compares the slippage with a pre-set slippage value and regulates then the valve 9 in such a way that this value is reached and the pre-set slippage maintained in the clutch.

I claim:

1. Method for operating a ship's propulsion installation having a Diesel engine and the ship's drive, means for detecting engine operating conditions, a pressure-medium-activated friction clutch with an adjustable pressure medium feed between the clutch elements connecting the Diesel engine and the ship's drive, and regulating means between the detecting means and the pressure medium feed, said method comprising, controlling the pressure of the pressure-medium in dependency on the operating conditions of the Diesel engine by initially setting the pressure of the pressure-medium at a relatively high holding value when the Diesel engine is idling, and then, upon the occurrence of an increase in torque variation sensed by said detecting means, decreasing the pressure holding value by means of the regulating means to cause a slippage in the friction clutch, thus dampening the torque variation and retaining the lower pressure holding value for as long as the increased torque variation continues.

2. Method according to claim 1, wherein there is included in the installation, means for detecting slippage in the friction clutch and there is included the steps of detecting the slippage in the friction clutch, and comparing the same against a predetermined pre-set slippage value, and maintaining the decreased pressure to the extent required for maintaining the slippage in the clutch in accordance with the pre-set value.

3. In a ship's propulsion installation including a Diesel engine, ship's driving means, and a pressure-medium-activated friction clutch between said engine and said driving means, said pressure-medium-activated friction clutch comprising driving and driven clutch elements and pressure-medium-feed means for maintaining said clutch elements in non-slipping relationship, means for adjusting the pressure of said pressure-medium-feed means provided between the Diesel engine and the ship's drive and further comprising means for monitoring the running behavior of the Diesel engine, slippage measuring means associated with said elements of said friction clutch for detecting quantitatively clutch element slippage, the improvement comprising said monitoring means and said slippage measuring means being connected to a regulator, said regulator constituting means responsive to changes in the running behavior of the Diesel engine for activating a valve which in turn regulates the supply of the pressure-medium for permitting relative clutch slippage and means connecting said slippage detecting means and said regulator for maintaining clutch element slippage, the arrangement being such that the pressure of the pressure-medium, initially set at a relatively high holding value when the Diesel engine is idling, is decreased by said regulating means upon the occurance of an increase in torque variation sensed by said detecting means to cause a slippage in the friction clutch, thus damping the torque variation and the lower pressure holding value is retained for as long as the increased torque variation continues and after which the pressure of the pressure-medium returns to the relatively high holding value.

4. A ship's propulsion installation in accordance with claim 3, characterized in that the friction clutch is a pneumatically activated, elastic double tapered friction clutch.

* * * * *

UNITED STATES PATENT AND TRADEMARK OFFICE
CERTIFICATE OF CORRECTION

PATENT NO. : 4,253,414
DATED : March 3, 1981
INVENTOR(S) : Wilhelm Schäfer

It is certified that error appears in the above-identified patent and that said Letters Patent are hereby corrected as shown below:

In the claims:

Column 4, Line 43, Word 3 [occurance] should be occurrence

Signed and Sealed this

Nineteenth Day of May 1981

[SEAL]

Attest:

RENE D. TEGTMEYER

Attesting Officer    Acting Commissioner of Patents and Trademarks